(12) United States Patent
Adams et al.

(10) Patent No.: US 12,345,337 B2
(45) Date of Patent: Jul. 1, 2025

(54) METAL SEAL FOR A FLAP VALVE

(71) Applicant: Adams GmbH, Herne (DE)

(72) Inventors: Martin Adams, Bochum (DE); Rudolf August Kappe, Marl (DE); Eugen Leno, Holzwickede (DE); Julian Krell, Bochum (DE); Fabian Sattelberger, Muenster (DE)

(73) Assignee: Adams GmbH, Herne (DE)

( * ) Notice: Subject to any disclaimer, the term of this patent is extended or adjusted under 35 U.S.C. 154(b) by 0 days.

(21) Appl. No.: 18/013,022

(22) PCT Filed: Jun. 30, 2021

(86) PCT No.: PCT/EP2021/068089
§ 371 (c)(1),
(2) Date: Dec. 27, 2022

(87) PCT Pub. No.: WO2022/003065
PCT Pub. Date: Jan. 6, 2022

(65) Prior Publication Data
US 2023/0243429 A1 Aug. 3, 2023

(30) Foreign Application Priority Data
Jun. 30, 2020 (WO) .................. PCT/EP2020/068397

(51) Int. Cl.
*F16K 1/226* (2006.01)
*B33Y 80/00* (2015.01)
*F16K 47/00* (2006.01)

(52) U.S. Cl.
CPC .......... *F16K 1/2261* (2013.01); *F16K 1/2263* (2013.01); *F16K 47/012* (2021.08); *B33Y 80/00* (2014.12)

(58) Field of Classification Search
CPC .......................... F16J 15/3232; F16K 47/012
(Continued)

(56) References Cited

U.S. PATENT DOCUMENTS 3,409,269 A * 11/1968 Fawkes ................. F16K 1/2285
251/173
3,955,859 A * 5/1976 Stella ................... F16J 15/3232
277/567
(Continued)

FOREIGN PATENT DOCUMENTS

DE        1 096 134 B    12/1960
DE      195 15 014 A1   10/1996
(Continued)

OTHER PUBLICATIONS

International Search Report in PCT/EP2021/068089 dated Sep. 30, 2021.

*Primary Examiner* — Jessica Cahill
(74) *Attorney, Agent, or Firm* — Collard & Roe, P.C.

(57) ABSTRACT

A metal seal for a flap valve, is disclosed which has a valve housing with a flow channel, in the flow cross-section of which a valve disk is disposed such that it can be swiveled around a swivel axis between an open position and a shutoff position. The seal has sealing elements, which can be pressed against one another, and which are disposed on the outer circumference of the valve disk and on the inner circumference of the valve housing, and they have at least one annular metal sealing lip, which in the shutoff position bears with elastic preload on an oppositely situated, likewise annular metal mating sealing face. To prevent damage to outer components, the metal sealing lip is produced in an additive method from metal materials having shape, cross-sectional geometry and/or alloy adapted to the different circumferential regions of the metal sealing lip.

8 Claims, 8 Drawing Sheets

Figure 1:
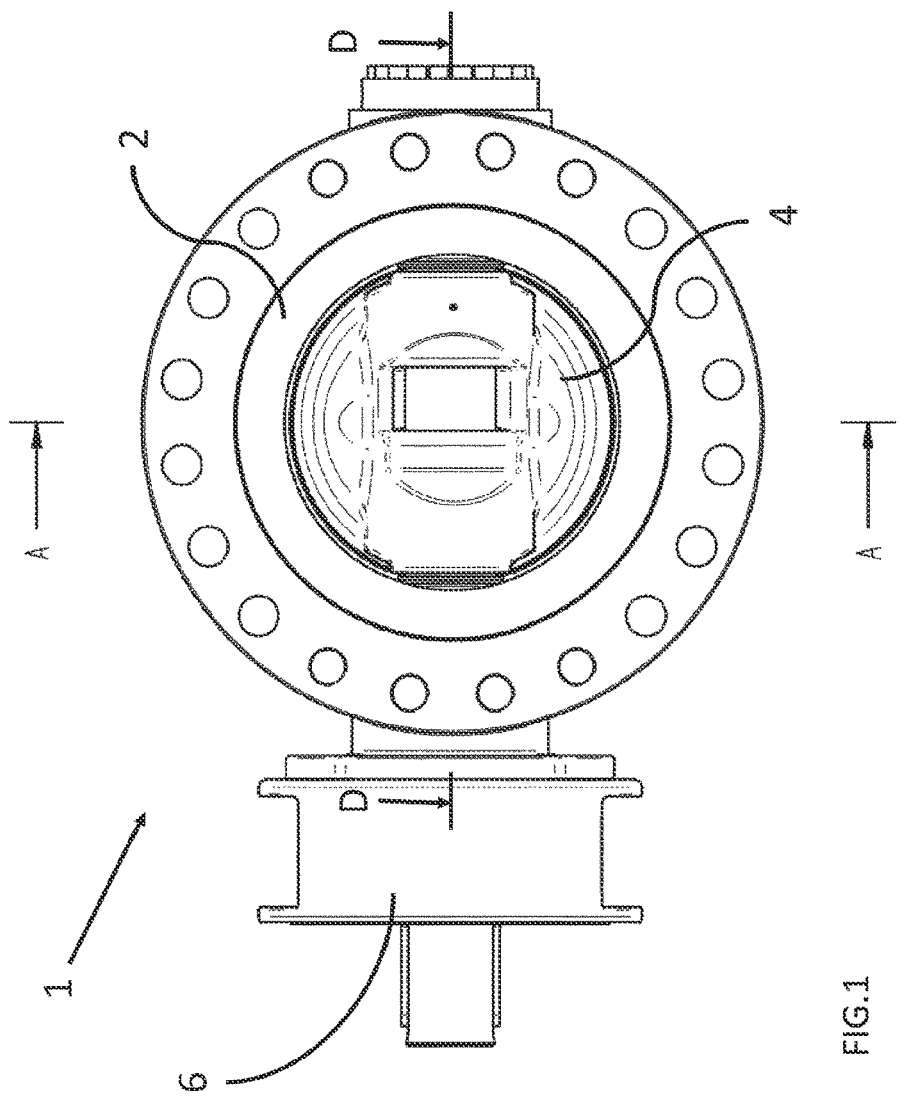

(58) Field of Classification Search
USPC .......................................................... 251/306
See application file for complete search history.

(56) References Cited

U.S. PATENT DOCUMENTS

| | | | | |
|---|---|---|---|---|
| 3,997,142 | A * | 12/1976 | Broadway | F16K 1/2263 251/307 |
| 4,303,249 | A * | 12/1981 | Illy | F16K 1/2285 251/173 |
| 4,341,233 | A * | 7/1982 | Broadway | F16K 1/2263 137/72 |
| 4,396,199 | A | 8/1983 | Boyd et al. | |
| 4,744,572 | A * | 5/1988 | Sahba | F16K 1/2266 277/641 |
| 8,714,522 | B2 * | 5/2014 | Hasegawa | F02D 9/1015 251/306 |
| 2003/0062689 | A1 * | 4/2003 | Olsson | F16J 15/3272 277/549 |
| 2007/0170391 | A1 * | 7/2007 | Liimatta | F02D 11/106 251/308 |
| 2017/0343108 | A1 * | 11/2017 | Hoang | F16K 3/0281 |
| 2023/0028144 | A1 * | 1/2023 | Yasuda | F16J 15/3236 |

FOREIGN PATENT DOCUMENTS

| | | | | |
|---|---|---|---|---|
| EP | 0 663 549 B1 | 12/1998 | | |
| EP | 0 771 976 B1 | 2/2001 | | |
| WO | 2019/067725 A1 | 4/2019 | | |
| WO | WO-2021080594 A1 * | 4/2021 | | F16K 1/2071 |

* cited by examiner

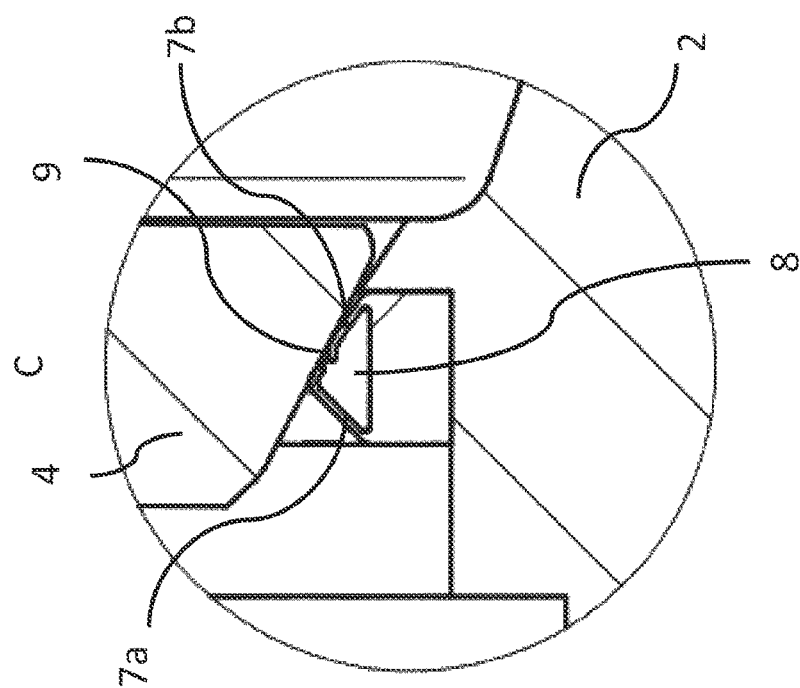
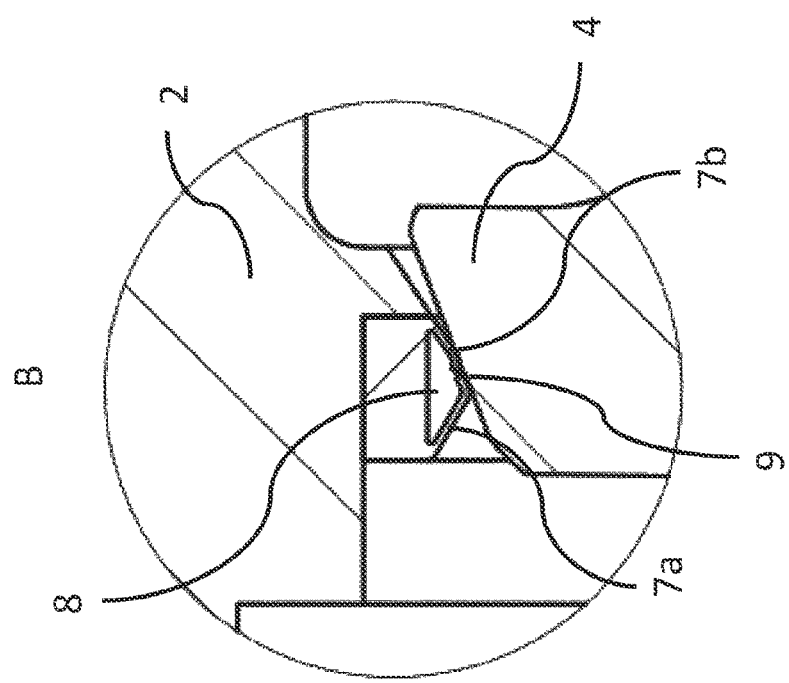
FIG.3

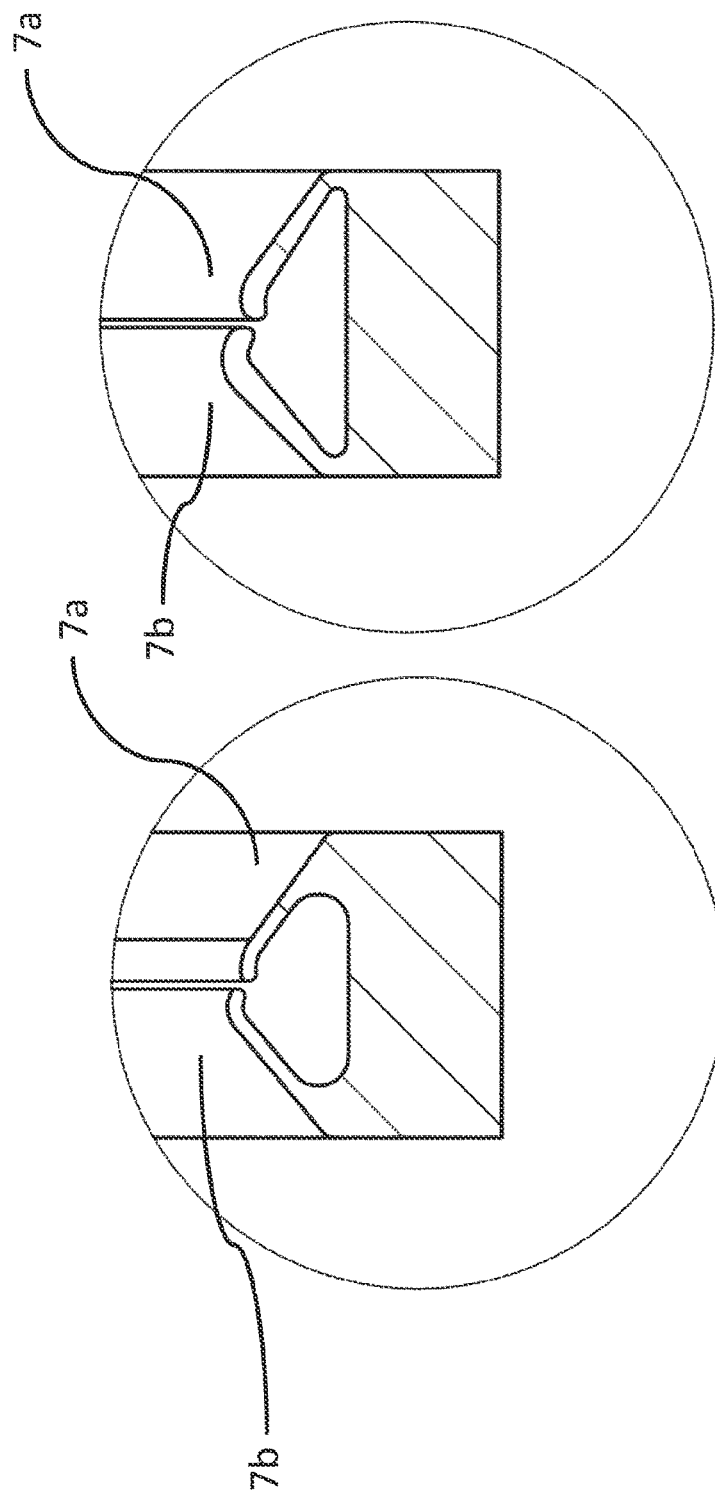

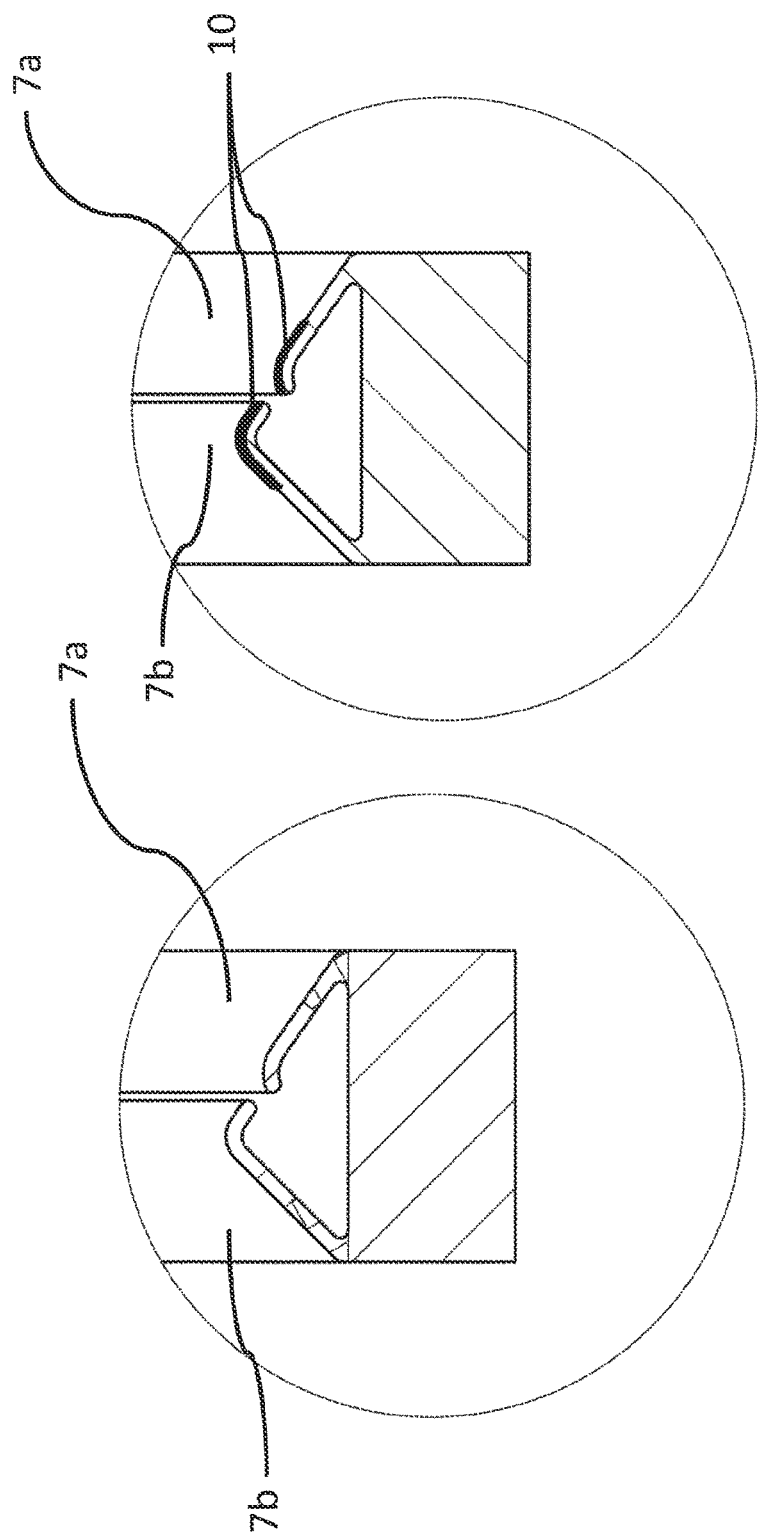

METAL SEAL FOR A FLAP VALVE

CROSS REFERENCE TO RELATED APPLICATIONS

This application is the National Stage of PCT/EP2021/068089 filed on Jun. 30, 2021, claiming priority to International Application No. PCT/EP2020/068397 filed on Jun. 30, 2020. The present application claims priority to and the benefit of the above-identified applications and the above-identified applications are incorporated by reference herein in their entirety. The international application under PCT article 21(2) was not published in English.

The invention relates to a metal seal for a flap valve, which has a valve housing with a flow channel, in the flow cross-section of which a valve disk is disposed such that it can be swiveled around a swivel axis between an open position and a shutoff position, wherein sealing elements, which can be pressed against one another, are disposed on the outer circumference of the valve disk and on the inner circumference of the valve housing, and they have at least one annular metal sealing lip, which in the shutoff position bears with elastic preload on an oppositely situated, likewise annular metal mating sealing face, wherein
- either the metal sealing lip is disposed on the outer circumference of the valve disk and the mating sealing face is disposed on the inner circumference of the valve housing
- or the mating sealing face is disposed on the outer circumference of the valve disk and the metal sealing lip is disposed on the inner circumference of the valve housing.

In the first place, flap valves with metal sealing lips have the advantage in principle over flap valves with sealing lips of plastic (polymer) in that they are extremely durable and heat resistant, i.e. have properties that are just not attainable with sealing lips of plastic (polymer).

Flap valves with such metal seals have been known for some time. In this regard, reference is made, for example, to EP 0 771 976 B1. The metal sealing lips used in such metal seals have the advantage that the sealing effect defined at first only by the elastic restoring force is reinforced when the cross section of the sealing lip extends in curved or inclined manner counter to the direction of the pressure gradient.

In order to be able to use this reinforcing effect in both flow directions, it is also known to provide, instead of only one metal sealing lip, two metal sealing lips, which are disposed at a distance from one another in the flow direction of the flap valve. In this regard, reference is made, for example, to the metal seal originating from EP 0 663 549 B1, in which the cross-sectional areas of the two metal sealing lips extend outwardly in inclined or bent-off manner relative to the hollow space remaining between them in the sealing position. This embodiment of the metal seal has the advantage that the reinforcing effect explained above is achieved in both possible flow directions and specifically at respectively the metal sealing lip situated on the high pressure side.

An even better and in particular more accurately controllable sealing effect is obtained when, in the case of use of two metal sealing lips disposed at a distance from one another in flow direction, the cross-sectional areas of the two metal sealing lips extend in inclined and/or bent-off manner (see U.S. Pat. No. 4,396,199 A) in the direction of the interior of the annular hollow space situated between them. The reinforcing effect explained above is achievable in both flow directions in this case also, but always only at the second metal sealing lip situated rearward in flow direction, whereas the first metal sealing lip, situated forward in flow direction, already permits flow at the sealing effect defined by its elastic preload. This special feature opens up a multiplicity of possibilities for monitoring and/or influencing the sealing effect of such a flap valve equipped with two metal sealing lips, for example by pressurizing or depressurizing the hollow space situated between the two metal sealing lips or—in the emergency situation—by filling this hollow space with a binding shutoff medium. However, because of the difficult matching of the sealing effect of the two metal sealing lips disposed one after the other, this special form of the metal seal has not yet been able to become widely used in practice.

An ever-recurring problem in metal seals of the type mentioned in the introduction consists in the fact that the sealing conditions and mechanical stresses are very different over the circumference of the valve disk or the circumference of the valve housing, and, in fact, especially with regard to the distance that the respective circumferential region has from the swivel axis of the flap valve. The causes of this are firstly the relative movements-which differ depending on the distance to the swivel axis-between the metal sealing lip on the one hand and the mating sealing face cooperating with this on the other hand. Especially the position of the swivel axis relative to the valve disk has a major influence on these movement paths. A distinction is made here between different constructions, for example
- the central construction, in which the swivel axis of the valve disk extends through the center of a circular seal arrangement,
- the singly eccentric construction, in which the swivel axis of the valve disk is axially shifted in flow direction along the axis of the flow channel,
- the doubly eccentric construction, in which, in addition to the singly eccentric construction, the swivel axis of the valve disk is shifted perpendicular to the axis of the flow channel,
- the triply eccentric construction, in which, in addition to the doubly eccentric construction, the plane of the sealing arrangement is no longer disposed perpendicular to the axis of the flow channel,
- the quadruply eccentric construction, in which, in addition to the triply eccentric construction, the sealing arrangement is formed not in circular but instead in oval shape,
- and the quintuply eccentric construction, in which, in addition to the quadruply eccentric construction, the plane of the sealing cone is disposed outside the axis of the flow channel.

The present invention relates to flap valves of all known constructions.

It is practically only in the central construction that the sealing arrangement has an exactly circular shape. In contrast, in all eccentric constructions, the shape of the sealing arrangement deviates more or less from the circular shape, which leads to complicated relative movements between the metal sealing lip on the one hand and the mating sealing face on the other hand.

The swiveling torques necessary in particular for closing and opening of the valve disk, above all the breakaway torque necessary for opening of the flap valves, are of great importance for the configuration of the metal seal. These closing torques and breakaway torques are naturally dependent on which sliding frictional forces or static frictional forces must be overcome at which distance from the swivel axis during opening and closing of the valve disk.

Further difficult problems also arise frequently due to the fact that, in those circumferential regions of the metal sealing lips in which the opening process begins, violent resonance vibrations, which lead relatively quickly to damage to the corresponding circumferential regions of the metal sealing lips and of the mating sealing face, are generated by the so-called Bernoulli effect. Attempts to counteract these phenomena have been made by matching the distribution of mass and the elastic restoring forces in the metal sealing lips to one another in such a way that those vibrations are suppressed as well as possible.

The problems mentioned above can hardly be solved in the known metal seals, because the metal sealing lips usually consist, for reasons of manufacturing technology, of the same material over the entire circumference and accordingly have the same physical properties all around. In view of the special features discussed above, practically unsolvable conflicting objectives therefore exist for the manufacture of metal sealing lips for metal seals of the type mentioned in the introduction, with the consequence that such metal sealing systems are generally usable to only a limited extent.

It is therefore the task of the invention to further develop the metal seal of the type mentioned in the introduction in terms of its physical properties to the effect that the sealing effect is improved, the actuation of the valve disk during opening and closing of the flap valve is facilitated and damage caused by resonance vibrations is prevented as far as possible.

In the context of this description, physical properties will be primarily understood as the mechanical properties, i.e. properties that are associated with effects of external forces (strength, stiffness, yield point, degree of damping, etc.). Depending on application situation, however, other physical material properties have also been important heretofore, e.g. thermal conductivity, coefficient of thermal expansion, permeability, etc.

For accomplishment of the set task, the invention proposes, starting from a metal seal of the type mentioned in the introduction, that the metal sealing lip be produced in an additive method from metal materials having shape, cross-sectional geometry and/or alloy adapted to the different circumferential regions of the metal sealing lip.

By the production of the metal sealing lip in an additive method, it is possible for the first time to give the various circumferential regions of the metal sealing lip properties that are optimally adapted to the different requirements in terms of the sealing effect, the static and sliding friction, the relative movement between metal sealing lip and mating sealing face, and the vibrational behavior.

Preferably, the metal sealing lip has circumferential portions wherein the flexural strength is different as a function of the distance of these circumferential portions relative to the swivel axis of the valve disk. In particular, it has been found that the distance between the swivel axis of the valve disk and the respective circumferential region of the metal sealing lip is the essential criterion for its adapted configuration, above all because this distance has quite substantial influence on the relative movement between the metal sealing lip on the one hand and the sealing face turned toward it on the other hand.

In this connection, it is provided, for example, that the circumferential portions of the metal sealing lip disposed with largest distance to the swivel axis of the valve disk have a higher flexural strength than the circumferential portions of the metal sealing lip disposed with smallest distance to this swivel axis.

In order to achieve this special distribution of the flexural strengths of the metal sealing lip, the invention proposes that the cross-sectional areas of the circumferential portions with largest distance to the swivel axis of the valve disk have higher area moments of inertia than the cross-sectional areas of the circumferential portions with smallest distance to the swivel axis of the valve disk.

This adaptation of the area moments of inertia of the cross sections of the metal sealing lips in the various circumferential portions not only has influence on the flexural strength in the circumferential portions in question, but additionally also have influence on the distribution of mass, whereby the vibrational behavior can in turn be influenced. According to the teaching of the invention, it is possible to match all of these physical properties to one another such that the damaging resonance vibrations caused by the Bernoulli effect are suppressed as far as possible and, in fact, because the circumferential portions of the metal sealing lip disposed at the largest distance to the swivel axis of the valve disk have a higher degree of damping than the circumferential portions of the metal sealing lip with smallest distance to that swivel axis.

The desired differences in flexural strength may also be created and influenced by using different production materials in the circumferential regions in question of the metal sealing lip, as is directly possible in an additive manufacturing. In this connection, the invention proposes that the circumferential portions with largest distance to the swivel axis of the valve disk consist of a metal alloy having stiffness higher than the stiffness of the metal alloy from which the circumferential portions with smallest distance to the swivel axis of the valve disk are produced. In this connection, it is possible to use suitable stainless iron alloys (alloys based on Fe, Ni and Co), for example, with adequately high yield point and high work-hardening coefficients for the production of the metal sealing lip. During the additive manufacturing, suitable material gradients can also be produced in the volume of the metal sealing lips, and specifically in both cross-sectional direction and in circumferential direction. Finally, it is also possible in the case of the additive manufacturing to undertake an intrinsic heat treatment in specific volume regions during the manufacturing, in order to create different properties within the volume of the metal sealing lip.

Finally, it is also important that, according to the teaching of the invention, the differently formed circumferential portions of the metal sealing lip transition gradually into one another in circumferential direction of the metal sealing lip. Hereby it is achieved that a uniform bearing of the metal sealing lip on the mating sealing face can be ensured all around despite the different configuration of the various circumferential regions.

In order to improve the sealing effect, it may ultimately also be provided that the surface regions of the metal sealing lip coming into contact with the mating sealing face are coated with a soft-sealing metal layer. Coatings of silver or of nickel come into consideration as examples here.

A particularly preferred embodiment of the invention provides that a second metal sealing lip is associated with the metal sealing lip and, in the flow direction of the flap valve, has a distance to the first metal sealing lip such that the two metal sealing lips together enclose an annular hollow space in the shutoff position of the flap valve while bearing on the mating sealing face, and such that the cross-sectional areas of the two metal sealing lips extend in inclined and/or bent-off manner in the direction of the interior of this annular hollow space, wherein the two metal sealing lips are produced in an additive method from metal materials and with shape, elasticity and hardness adapted to the local requirements and have different physical properties distributed over the circumference. Due to the use of metal sealing lips of the type explained in the foregoing, i.e. of metal sealing lips that are produced in an additive method, it is possible for the first time to match the quite special requirements applicable to the two cooperating metal sealing lips exactly to one another over the entire circumference, whereby this metal sealing system, which is advantageous in principle, has been made diversely usable in practice for the first time.

Figure 2:
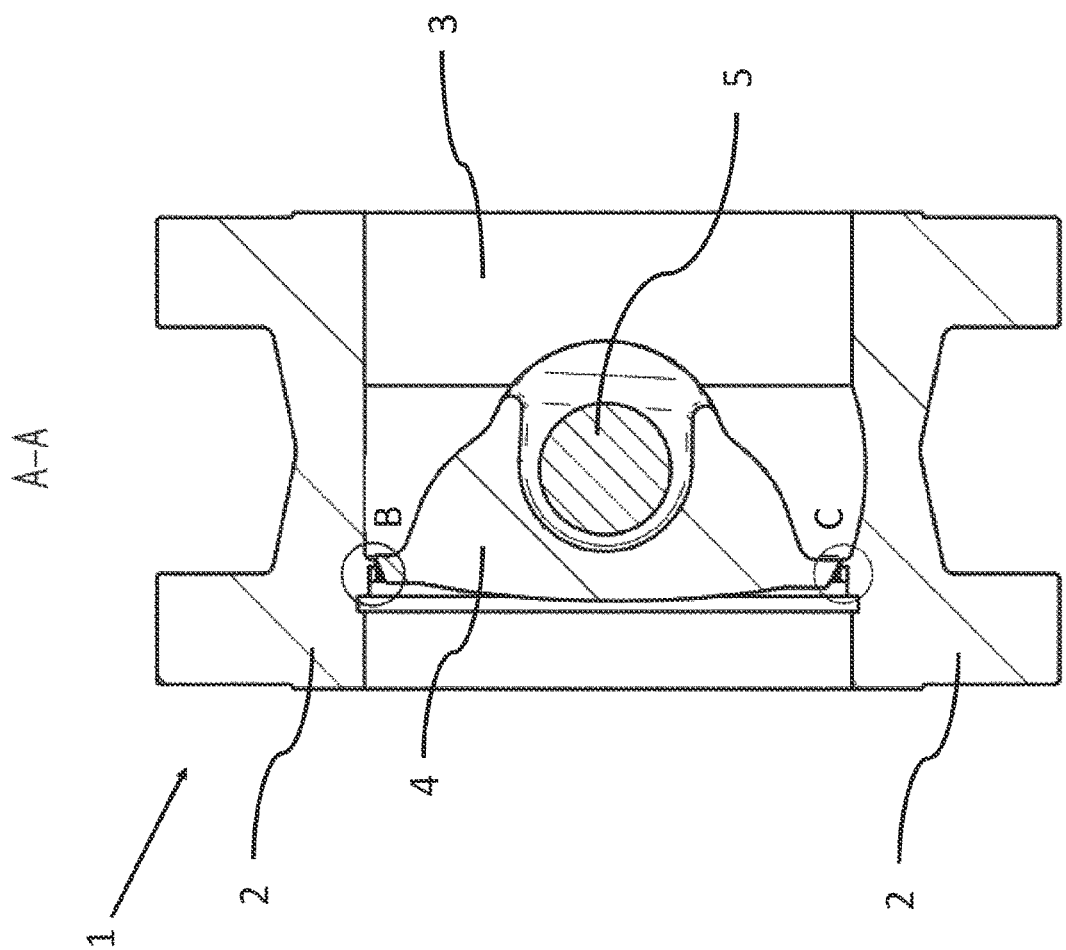
Figure 4:
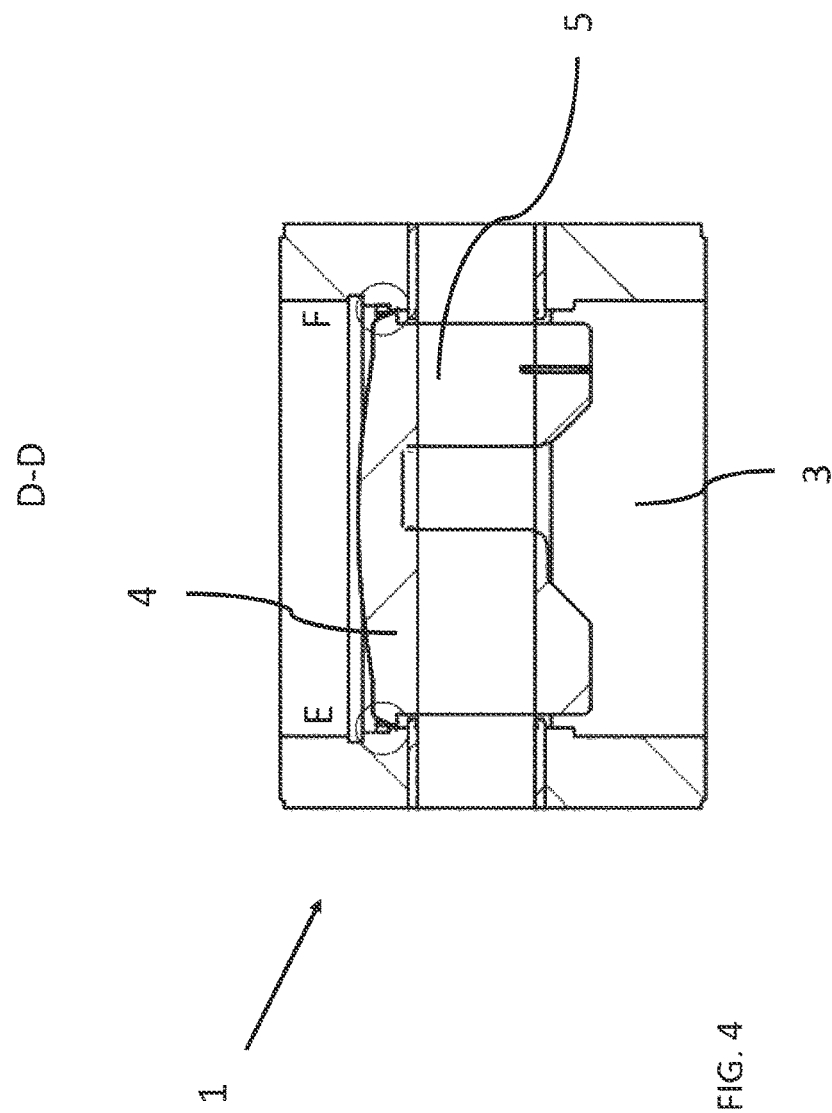
Figure 5:
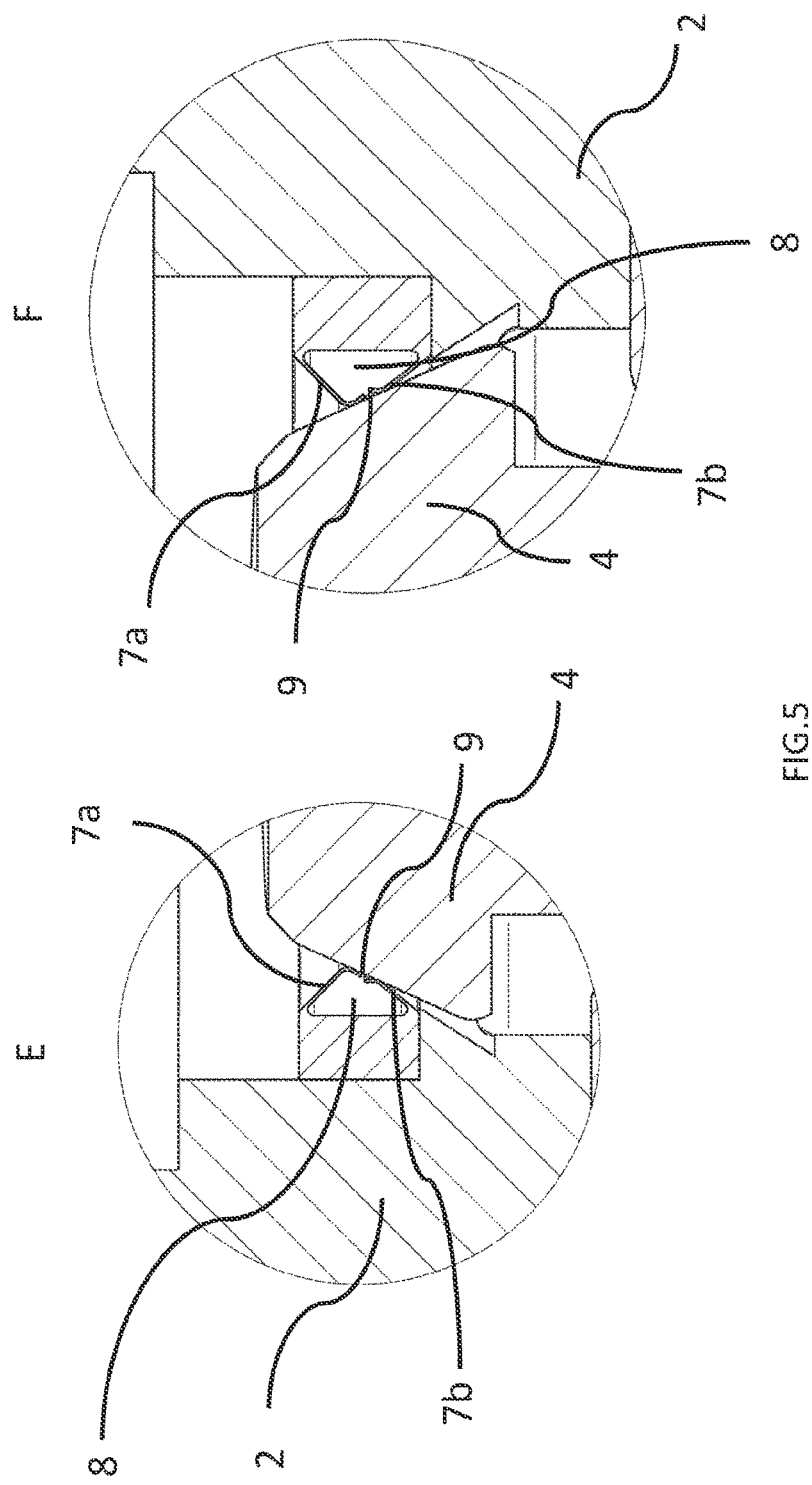
Figure 10:
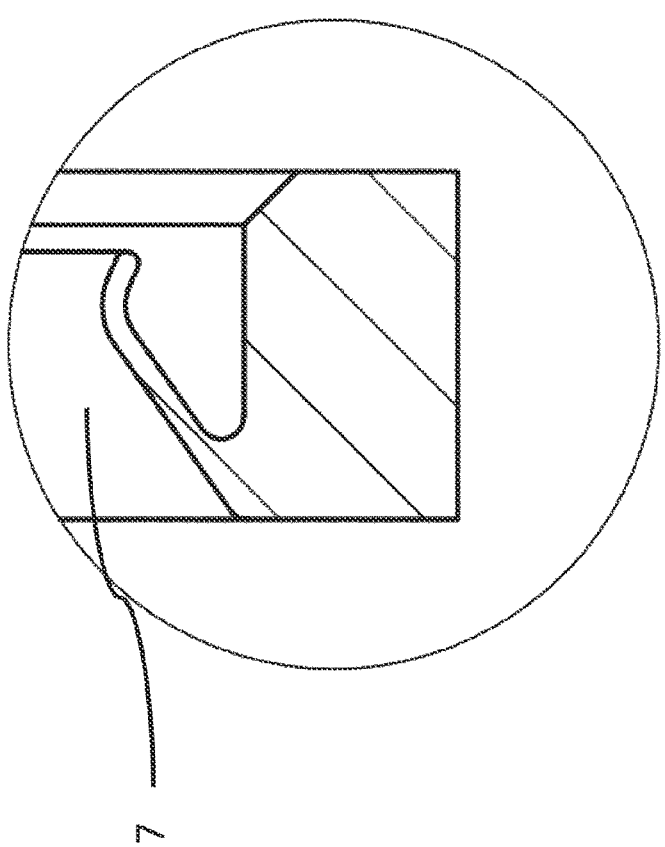

An exemplary embodiment of the invention will be explained in more detail in the following on the basis of the drawing, wherein FIG. 1: schematically shows the frontal view of a flap valve looking in flow direction;

FIG. 2: shows a section along the line A-A in FIG. 1;

FIG. 3: shows an enlargement of the details B and C from FIG. 2, i.e. the metal seal according to the invention in the circumferential regions with the largest distance to the swivel axis;

FIG. 4: shows a section along the line D-D in FIG. 1;

FIG. 5: shows an enlargement of the details D and E from FIG. 4, i.e. the metal seal according to the invention in the circumferential regions with the smallest distance to the swivel axis;

FIGS. 6, 7,8 and 9: show various possible cross sections of the metal sealing lip in different circumferential regions of the metal seal;

FIG. 10: shows the cross section through a metal sealing lip for a metal seal with only one single metal sealing lip.

In the drawing, the flap valve is denoted in its entirety with the reference numeral 1. The flap valve 1, which may be built into a pipeline, for example, has a valve housing 2, which is equipped with a circular flow channel 3, in the flow direction of which a valve disk 4 is disposed that can be turned in the flow channel 3 around a swivel axis 5. A swivel drive 6 fastened externally on the valve housing 2 is used for movement of the valve disk 4 around the swivel axis 5. In the drawing, the valve disk 4 is situated in the shutoff position, in which it completely shuts off the flow channel 3 of the valve housing 2.

Two annular metal sealing lips 7a and 7b, which are disposed at a short distance from one another in flow direction of the flow channel 3 and leave an annular hollow space 8 between them, are fastened to the inner circumference of the flow channel 3. The cross sections of these two metal sealing lips 7a and 7b extend in the direction of the interior of this hollow space 8 in inclined or bent-off manner.

The valve disk 4 of the flap valve 1 is equipped on its outer circumference with an annular mating sealing face 9, which in the illustrated shutoff position of the valve disk 4 bears on the annular metal sealing lips 7a and 7b. In the illustrated shutoff position, these two metal sealing lips 7a and 7b are subjected to elastic preload and thus form, together with the mating sealing face 9 of the valve disk 4, a more secure metal seal.

In contrast to the illustrated exemplary embodiment, it is also possible—inversely—to dispose the metal sealing lips on the outer circumference of the valve disk 4 and the mating sealing face on the inner circumference of the flow channel 3 of the valve housing 2. Furthermore, it is also possible to provide only one single metal sealing lip instead of two metal sealing lips 7a and 7b. As explained in the introduction, however, such a metal seal with only one metal sealing lip then acts in self-reinforcing manner only in one flow direction.

According to the teaching of the invention, the metal sealing lips 7a and 7b are produced in an additive method from metal materials with shape, elasticity and hardness adapted to the local requirements and have various flexural strengths distributed over their circumference.

This special feature will be explained in the following on the basis of a comparison of FIGS. 3 and 5. FIG. 3 shows enlarged cross sections through the metal sealing lips 7a and 7b in the circumferential regions with the largest distance from the swivel axis 5, i.e. the details B and C from FIG. 2. A comparison of these details B and C shows that the metal sealing lips 7a and 7b clearly differ from one another both in the geometric shape and in the cross-sectional area in these two circumferential regions. The differences in the geometric shape serve first of all for better adaptation to the different relative movements that occur during the opening and closing process between the metal sealing lips 7a and 7b on the one hand and the mating sealing face 9 on the other hand. The different cross-sectional areas of the metal sealing lips 7a and 7b match their flexural strength and mass to the special requirements in these circumferential regions. The correctly matched elasticity and distribution of masses in these circumferential regions is of great importance here for counteracting the particularly intensively occurring resonance vibrations caused by the Bernoulli effect in these circumferential regions during the opening and closing process.

In contrast, the sealing conditions in the circumferential regions with the smallest distance to the swivel axis 5 are much simpler, as is illustrated in FIGS. 4 and 5 on the basis of details E and F. In these circumferential regions, the metal sealing lips 7a and 7b may then be constructed as equal to one another in shape and cross section as well as advantageously thin, because the relative movements with respect to the mating sealing face 9 permit this and resonance phenomena are less to be feared. A further advantage consists in the fact that smaller closing and breakaway torques are needed because of the smaller friction between metal sealing lips 7a and 7b and mating sealing face 9.

Finally, it is further important for the functional capability of the new metal seal that the differently constructed circumferential portions (compare the details B and C explained above on the one hand and E and F on the other hand) transition continuously into one another in circumferential direction, which is possible without problems in an additive manufacturing. It is only by such a gradual transition that it can be ensured that the metal sealing lips 7a and 7b bear uniformly all around on the mating sealing face 9.

FIGS. 6, 7 and 8 show various exemplary embodiments of possible cross-sectional shapes of metal sealing lips 7a and 7b produced in the additive production method and capable of being used in the different circumferential regions. FIG. 9 shows metal sealing lips 7a and 7b in cross section, in which the surface regions coming into contact with the mating sealing face 9 are coated with a soft-sealing metal layer 10.

Finally, FIG. 10 shows the cross-sectional configuration of a metal sealing lip 7 to be used alone for a metal seal, which is equipped with only one single metal sealing lip.

The invention claimed is:

1. A metal seal for a flap valve, comprising:
   a valve housing with a flow channel, in the flow cross-section;
   a valve disk is disposed such that it can be swiveled around a swivel axis between an open position and a shutoff position,
   a plurality of sealing elements, which can be pressed against one another, and are disposed on the outer circumference of the valve disk and on the inner circumference of the valve housing, and they have at least one annular metal sealing lip, which in the shutoff position bears with elastic preload on an oppositely situated, likewise annular metal mating sealing face, wherein either the metal sealing lip is disposed on the outer circumference of the valve disk and the mating sealing face is disposed on the inner circumference of the valve housing or the mating sealing face is disposed on the outer circumference of the valve disk and the metal sealing lip is disposed on the inner circumference of the valve housing, wherein the metal sealing lip is produced in an additive method from metal materials having shape, cross-sectional geometry and/or alloy adapted to the different circumferential regions of the metal sealing lip and wherein the metal sealing lip has circumferential portions wherein the flexural strength is different as a function of the distance of these circumferential portions relative to the swivel axis of the valve disk;

wherein the circumferential portions of the metal sealing lip disposed with largest distance along the circumference of the valve disk to the swivel axis of the valve disk have a higher flexural strength than the circumferential portions of the metal sealing lip disposed with smallest distance to this swivel axis.

2. The metal seal according to claim 1, wherein the cross-sectional areas of the metal sealing lip in the circumferential portions with largest distance to the swivel axis of the valve disk have higher area moments of inertia than the cross-sectional areas of the metal sealing lip in circumferential portions with smallest distance to the swivel axis of the valve disk.

3. The metal seal according to claim 1, Wherein the circumferential portions of the metal sealing lip largest distance to the swivel axis of the valve disk have a higher degree of damping than circumferential portions with smallest distance to the swivel axis of the valve disk.

4. The metal seal according to claim 1, wherein the circumferential portions of the metal sealing lip with largest distance to the swivel axis of the valve disk comprise a first metal alloy having stiffness greater than the stiffness of a second metal alloy of which the circumferential portions of the metal sealing lip have the smallest distance to the swivel axis of the valve disk.

5. The metal seal according to claim 1, wherein the differently formed circumferential portions of the metal sealing lip transition gradually into one another in circumferential direction of the metal sealing lip.

6. The metal seal according to claim 1, wherein the surface regions of the metal sealing lip coming into contact with the mating sealing face are coated with a soft-sealing metal layer.

7. The metal seal according to claim 1, wherein a second metal sealing lip is associated with the metal sealing lip and, in the flow direction of the flap valve, has a distance to the first metal sealing lip such that the two metal sealing lips together enclose an annular hollow space in the shutoff position of the flap valve while bearing on the mating sealing face, and such that the cross-sectional areas of the two metal sealing lips extend in inclined and/or bent-off manner in the direction of the interior of this annular hollow space.

8. A metal seal for a flap valve, comprising:
a valve housing with a flow channel, in the flow cross-section;
a valve disk is disposed such that it can be swiveled around a swivel axis between an open position and a shutoff position,
a plurality of sealing elements, which can be pressed against one another, and are disposed on the outer circumference of the valve disk and on the inner circumference of the valve housing, and they have at least one annular metal sealing lip, which in the shutoff position bears with elastic preload on an oppositely situated, likewise annular metal mating sealing face, wherein
either the metal sealing lip is disposed on the outer circumference of the valve disk and the mating sealing face is disposed on the inner circumference of the valve housing or the mating sealing face is disposed on the outer circumference of the valve disk and the metal sealing lip is disposed on the inner circumference of the valve housing, wherein
the metal sealing lip is produced in an additive method from metal materials having shape, cross-sectional geometry and/or alloy adapted to the different circumferential regions of the metal sealing lip and wherein the metal sealing lip has circumferential portions wherein the flexural strength is different as a function of the distance of these circumferential portions relative to the swivel axis of the valve disk;
wherein the circumferential portions of the metal sealing lip with largest distance to the swivel axis of the valve disk comprise a first metal alloy having stiffness greater than the stiffness of a second metal alloy of which the circumferential portions of the metal sealing lip have the smallest distance to the swivel axis of the valve disk.

* * * * *